(12) United States Patent
Bresolin (10) Patent No.: US 10,174,761 B2
(45) Date of Patent: Jan. 8, 2019

(54) SYNCHRONOUS ELECTRIC MOTOR FOR THE OPERATION OF A PUMP AND THE RELATED MOTOR PUMP

(71) Applicant: HYDOR SRL, Vicenza (IT)

(72) Inventor: Valerio Bresolin, Vicenza (IT)

(73) Assignee: HYDOR SRL, Vicenza (IT)

( * ) Notice: Subject to any disclaimer, the term of this patent is extended or adjusted under 35 U.S.C. 154(b) by 0 days.

(21) Appl. No.: 15/601,108

(22) Filed: May 22, 2017

(65) Prior Publication Data

US 2017/0321703 A1 Nov. 9, 2017

Related U.S. Application Data

(62) Division of application No. 14/005,501, filed as application No. PCT/IT2012/000070 on Mar. 13, 2012.

(30) Foreign Application Priority Data

Mar. 15, 2011 (IT) .............................. VE2011A0015

(51) Int. Cl.
*H02K 9/00* (2006.01)
*F04D 13/06* (2006.01)
(Continued)

(52) U.S. Cl.
CPC ............ *F04D 13/06* (2013.01); *F04D 13/064* (2013.01); *F04D 29/047* (2013.01); *H02K 9/193* (2013.01)

(58) Field of Classification Search
CPC ........ F04D 13/06; F04D 29/047; F04B 17/03; H02K 1/27; H02K 5/16; H02K 1/02; H02K 11/00; H02K 7/118; H02K 21/14
See application file for complete search history.

(56) References Cited

U.S. PATENT DOCUMENTS 5,039,286 A 8/1991 Point et al.
5,767,606 A 6/1998 Bresolin
(Continued)

FOREIGN PATENT DOCUMENTS

DE 18 11 430 A1 6/1970
FR 69 944 E 1/1959

OTHER PUBLICATIONS

International Search Report issued in corresponding application PCT/IT2012/000070, completed Aug. 23, 2012 and dated Sep. 3, 2012.
(Continued)

*Primary Examiner* — Joshua Benitez Rosario
*Assistant Examiner* — Leda Pham
(74) *Attorney, Agent, or Firm* — Griffin and Szipl PC (57) ABSTRACT

A synchronous electric motor for operating a pump includes a motor body, a stator and a rotor coupled to an impeller of the pump. The motor also comprises a cylindrical element that extends towards the inside of the motor body from one of its outer walls so as to define a first cylindrical cavity open to the outside to insert inside the rotor, wherein the rotor has a circular cross section essentially corresponding to the inner section of the cylindrical element so that the rotor is in contact with the cylindrical element and then there is a friction between the rotor and the cylindrical element when the rotor rotates, and the rotor is shaftless and axially and directly coupled to the impeller of the pump.

10 Claims, 6 Drawing Sheets

(51) Int. Cl.
*F04D 29/047* (2006.01)
*H02K 9/193* (2006.01)

(56) References Cited

U.S. PATENT DOCUMENTS

| 6,254,361 | B1* | 7/2001 | Sabini | F04D 13/0646 |
|---|---|---|---|---|
| | | | | 417/366 |
| 2005/0106015 | A1* | 5/2005 | Osgood | F04D 29/0413 |
| | | | | 415/216.1 |
| 2008/0036310 | A1 | 2/2008 | Marioni | |
| 2008/0199334 | A1 | 8/2008 | Sorensen | |

OTHER PUBLICATIONS

McGraw-Hill Dictionary of Scientific and Technical Terms 1056 (6th ed. 2002), pp. 1910 ("Shaft"), 1824 ("Rotor"), and 1056 ("Impeller").
"Self-lubrication of PPEK polymer bearings in rolling contact fatigue under radial loads," Tribology International 49, Dec. 21, 2011.

\* cited by examiner

PRIOR ART

SYNCHRONOUS ELECTRIC MOTOR FOR THE OPERATION OF A PUMP AND THE RELATED MOTOR PUMP

This is a divisional of U.S. application Ser. No. 14/005,501, which is the National Phase Application in the United States of International Patent Application No. PCT/IT2012/000070 filed Mar. 13, 2012, which claims priority on Italian Patent Application No. VE2011A000015, filed Mar. 15, 2011. The entire disclosures of the above patent applications are hereby incorporated by reference.

FIELD OF THE INVENTION

The present invention relates to a synchronous electric motor for the operation of a pump. The invention also relates to a motor pump comprising a synchronous electric motor coupled to a pump.

BACKGROUND OF THE INVENTION

It is well known to use synchronous motors for the operation of pumps, such as pumps for aquariums, pumps for household appliances as, for example, washing machines, dishwashers and more. Synchronous motors comprise a motor body inside which a stator and a rotor are housed. The stator comprises a statoric pack, usually a stack of magnetic laminations, on which one or more electrical windings are wound. The statoric pack has at least two pole pieces inside which a rotor is positioned. Then, the stator forms the inductor of the electric motor.

The rotor usually consists of a permanent magnet of cylindrical shape and constitutes the armature of the electric motor. By feeding the electric windings, a magnetic flux is generated in the statoric pack and, therefore, magnetic poles are generated at the pole pieces that interact with the magnetic field of the rotor, thus causing the rotation of the rotor. The rotor usually is holed in the centre, and inside a shaft is rigidly inserted and fixed. The shaft is supported at its two ends by respective bushes, which are rigidly secured inside cavities formed in the motor body. The impeller of the pump is fixed to one of the two ends of the shaft.

Figure 1:
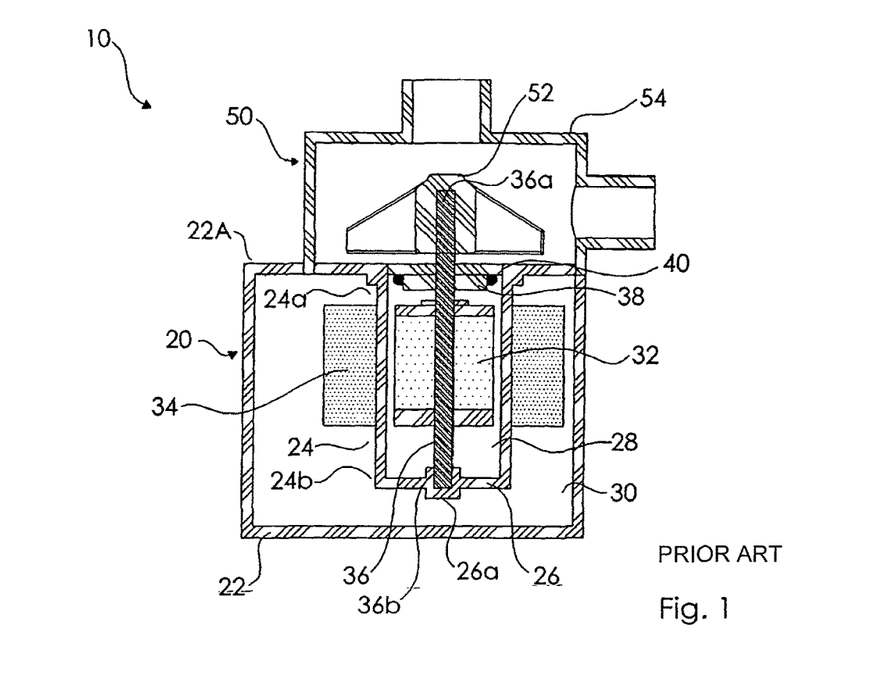
FIG. 1 illustrates a motor pump of the prior art.

In some motors of the prior art, as shown in FIG. 1, a cylindrical element is used for insulating the statoric part from the rotoric part and, thus, prevents the electric windings of the stator from coming into contact with the liquid to be pumped. In this FIG. 1, a motor pump 10 of the prior art comprising a motor 20 coupled to a pump 50 is shown.

The motor 20 comprises a motor body 22 delimited by walls. By starting from an upper wall 22A of the motor body 22, a cylindrical element 24 extends towards the inside having two ends: a first end 24a facing the wall 22A and open towards the outside, and a second end 24b facing the inside of the motor body 22 and closed by a bottom 26. The cylindrical element 24 thus defines two cavities: a first cavity 28 inside the cylindrical element 24 and a second cavity 30 outside the cylindrical element 24, but contained inside the motor body 22.

A rotor 32 containing a magnet is housed in the first cavity 28, while the stator is housed in the second cavity 30, wherein the pole pieces 34 of the stator have been represented in FIG. 1. The rotor 32 comprises a shaft 36, which is inserted and fixed inside a hole made in the centre of the rotor 32. The shaft 36 has two ends: a first end 36a on which the impeller 52 of the pump 50 is fixed, and a second end 36b housed inside a seat 26a formed on the bottom 26 of the cylindrical element 24. A portion of the shaft 36 between the rotor 32 and the impeller 52 is inserted into a bush 38 wherein the shaft 36 is free to rotate. The bush 38 is fixed by a gasket 40, for example an O-ring, inside the cylindrical element 24.

The pump 50 comprises a pump body 54 mounted onto the motor body 22, and inside the pump body 54 the impeller 52 is housed. By feeding the electric windings of the stator, magnetic poles are generated at the pole pieces 34 which, by interacting with the magnetic field of the rotor magnet 32, put the rotor 32 in rotation and, therefore, also the impeller 52. As can be seen, thanks to the cylindrical element 24, the second cavity 30 that houses the stator is completely closed and, therefore, the electrical windings are completely insulated.

However, this embodiment of the prior art just described has several drawbacks. First of all, the embodiment is quite complex since it is necessary to construct a shaft for transmitting motion from the rotor to the impeller, and it is also necessary to construct a rotor with a hole inside where the shaft is inserted and fixed, and a bush to support one end of the shaft and a housing seat for supporting the other end of the shaft. In addition, once all these elements are constructed, it is necessary to mount them to each other. Then, both the production costs for obtaining the individual pieces, and their assembly, are high. Then, with time and due to wear, it is inevitable that some components may fail and interrupt the correct operation of the motor pump, and also making necessary a cost for the intervention by specialized personnel.

In particular, since the gasket 40 is in contact with the pump body, it is also in contact with the fluid to be pumped, which in some cases is dirty or even aggressive. In fact, the water waste of a washing machine contains chemically aggressive detergents that easily attack and erode the gaskets; therefore, they must be frequently replaced causing evident inconveniences. Moreover, spaces or air chambers are defined between the first cylindrical cavity 28 and the rotor 32, and, more precisely, a first air chamber between the rotor 32 and the bottom 26 of the cylindrical element 24 and a second air chamber between the rotor 32 and the bush 38. Then, the two air chambers are in communication with each other through the space defined between the cylindrical element 24 and the rotor 32.

It was established by the applicant that these air chambers due to (a) the constant starting and stopping of the motor, and (b) the variation of the temperature of the liquid to be pumped (for example, in case of a motor pump for washing machines or dishwashers, the liquid can be either at room temperature or heated), function as minipumps, which suck the liquid contained in the impeller body. But, despite the fact gasket 40 is used, these air chambers are able to suck the liquid contained in the impeller body especially if, as indicated above, it has to be considered that the seals are worn and attacked by the liquid to be pumped.

Therefore, the impurities contained in the liquid, such as detergents, cleansing agents and various impurities in case of motor pumps for washing machines or dishwashers, penetrate inside the cavity, which houses the rotor and, with time, they accumulate and prevent the correct rotation of the rotor inside the cavity, thus causing jamming or irreparable damages to the rotor. This causes issues due to the stopping of the motor and, then, generates a high cost for maintenance or even replacement of the damaged motor pump.

The aim of the present invention is to obviate the drawbacks mentioned above with reference to the cited prior art and, in particular, to avoid a rapid wear of the various components that form the electric motor. Especially, an aim of the present invention is to prevent the rotor functioning incorrectly, or even jamming or failing due to impurities that could penetrate into the cavity.

SUMMARY OF THE INVENTION

These aims, discussed above, are achieved by a motor pump according to a first non-limiting illustrative embodiment of the present invention, in which a motor pump (100) comprises an electric motor (120) coupled to a pump (150), wherein the electric motor (120) includes a motor body (122), a stator (140) and a rotor (132,232) coupled to an impeller (152) of the pump (150), wherein the motor (120) further comprises a cylindrical element (124,224) that extends towards the inside of the motor body (122) from one of its outer walls (122A) so as to divide the inside of the motor body (122) in two cavities, namely, a first cylindrical cavity (128) inside the cylindrical element (124,224) that is able to house the rotor (132,232) and a second cavity (130) outside the cylindrical element (124,224) that is able to house the stator (140), wherein the cylindrical element (124,224) has a first open end (125a), opposite to a second end (125b), positioned at the outer wall (122A) of the motor body (122) so that the first cylindrical cavity (128) is open to the outside so as to insert the rotor (132,232) inside the cylindrical element (124,224), characterized in that the rotor (132,232), for at least part of its length, has a circular cross section essentially corresponding to the inner section of the cylindrical element (124,224) so that the rotor (132,232) is in contact with the cylindrical element (124,224), and then there is a friction between the rotor (132,232) and the cylindrical element (124,224) when the rotor (132,232) rotates, and the rotor (132,232) is shaftless and axially and directly coupled to the impeller (152) of the pump (150).

In accordance with a second non-limiting illustrative embodiment of the present invention, the first embodiment is modified so that the entire portion of the rotor (132,232) housed inside the cylindrical element (124,224) has a circular cross section corresponding to the inner section of the cylindrical element (124,224), so that all the portion of the rotor housed inside the cylindrical element (124,224) is in contact with the cylindrical element (124,224). In accordance with a third non-limiting, illustrative embodiment of the present invention, the second non-limiting embodiment is further modified so that the rotor (132,232) has a length equal or higher than the length of the cylindrical element (124,224), so that the rotor essentially fills the entire first cavity (128) inside the cylindrical element (124,224), so that between the cylindrical element (124,224) and the rotor (132,232) there is no space or gap and the frictional contact between the rotor (132,232) and the cylindrical element (124,224) occurs for the entire length of the first cavity (128) of the cylindrical element (124,224). In accordance with fourth non-limiting, illustrative embodiment of the present invention, the first, second and third non-limiting embodiments are further modified so that the cylindrical element (124,224) is made of self-lubricating and wear-resistant material. In accordance with a fifth non-limiting, illustrative embodiment of the present invention, the fourth non-limiting embodiment is further modified so that the self-lubricating and wear-resistant material is a polymeric material.

In accordance with a seventh non-limiting illustrative embodiment of the present invention, the first, second, third, fourth, fifth and sixth non-limiting embodiments are further modified so that the cylindrical element (124,224) comprises a collar (127) at its first end, and the motor body (122) has an opening (123) with the shape and dimensions corresponding to that of the collar (127), so that by inserting the cylindrical element (124,224) inside the motor body (122) the collar (127) closes the opening (123) of the motor body (122). In accordance with an eighth non-limiting, illustrative embodiment of the present invention, the first, second, third, fourth, fifth, sixth and seventh non-limiting embodiments are further modified so that the rotor (132,232) comprises at least one permanent magnet (134). In accordance with a ninth non-limiting illustrative embodiment of the present invention, the first, second, third, fourth, fifth, sixth, seventh and eighth non-limiting embodiments are further modified so that the stator (140) comprises at least one statoric pack (142) defining at least two pole pieces (142A, 142B) faced to the cylindrical element (124,224) and at least one electric winding (144) to generate a magnetic field and then at least two magnetic poles at the at least two pole pieces (142A, 142B).

In accordance with a tenth non-limiting illustrative embodiment of the present invention, the first, second, third, fourth, fifth, sixth, seventh, eighth and ninth non-limiting embodiments are further modified so that the motor pump comprises a duct (229) placed on the side of the cylindrical element (224) and that defines a longitudinal slot (228) of communication between the cylindrical element (224) and the duct (229), wherein the duct (229) is in communication with the pump (150) so that the fluid pumped by the pump (150) can enter into the duct (229) and lubricate and/or cool the contact area between the rotor (232) and the cylindrical element (224). In accordance with an eleventh non-limiting, illustrative embodiment of the present invention, the first, second, third, fourth, fifth, sixth, seventh, eighth, ninth and tenth non-limiting embodiments are further modified so that the duct (229) also communicates with the area interposed between the rotor (232) and the bottom (226) of the cylindrical element (224), wherein the rotor (232) is also provided with a through hole (237) so that the fluid that arrives between the bottom (226) of the cylindrical element (224) and the rotor (232) can pass through the rotor (232) and then comes out. In accordance with a twelfth non-limiting illustrative embodiment of the present invention, the first, second, third, fourth, fifth, sixth, seventh, eighth, ninth, tenth and eleventh non-limiting embodiments are further modified so that the pump (150) comprises a pump body (154) inside which the impeller (152) of the pump (150) is housed, wherein the pump body (154) is provided with a suction intake (156) through which the liquid to be pumped is sucked and an outlet (158) through which the pumped liquid goes out, wherein inside the pump body (154) is defined a passage (162) that connects the suction intake (156) to the outlet (158) and that has a dimension equal or greater than the dimension of the suction intake (156) and of the outlet (158), so that any foreign body that penetrates inside the pump body (154) through the suction intake (156) can pass through the passage (162) and go out from the outlet (158).

In this way, the construction design of the motor is considerably simplified since, compared to the motors of the prior art, there is no drive shaft, and it is not necessary to drill the rotor in order to insert the shaft, and it is not necessary to construct the bushes, or other supports, inside which the ends of the shaft rotate. It is simply necessary to realize only a rotor and coupled it axially and directly to the impeller. In fact, bearing in mind that the rotor, for at least a portion of its length, has a section corresponding to the cylindrical cavity of the cylindrical element inside which it is housed, there is no need of any support as the rotor is directly supported by the cylindrical element inside which it is inserted. In other words, the rotor itself operates as a shaft and the bushes are replaced by the cylindrical element inside which the rotor rotates.

Thanks to the simplicity of this construction, the production time of such a motor is considerably reduced and the manufacturing cost is significantly limited. Moreover, the diameter of contact between the rotor and the cylindrical element is much higher than the diameter of contact between the drive shaft and the bushes of the prior art motors and, therefore, the contact surface is much wider. Consequently, the contact pressures are very limited, so there is a significant reduction of the wear. In this way, the service life of the motor significantly extends.

Furthermore, due to the fact that there is a direct contact between the rotor and the cylindrical element for at least a portion of the length of the rotor, the fluid is not able to penetrate inside the cavity housing the rotor. Therefore, there is no risk that the rotor can be subject to malfunctions or jammings due to the impurities contained in the fluid to be pumped.

Preferably, the entire part of the rotor housed within the cylindrical element has a circular cross-section corresponding to the inner section of the cylindrical element, so that the whole part of the rotor housed inside the cylindrical element is in contact with the cylindrical element. In particular, the rotor has a length equal or higher than the length of the cylindrical element so that the rotor substantially engages the entire inner cavity of the cylindrical element, so that between the cylindrical element and the rotor there are no spaces or voids, and the friction contact between the rotor and the cylindrical element occurs for the entire length of the first inner cavity of the cylindrical element.

It is evident that if the rotor completely engages the cavity wherein it is housed, first of all, the contact occurs on a very extensive surface increasing the benefits described previously, but above all there is no possibility that impurities penetrate inside the cavity. This is due not only because the entire cavity is engaged by the rotor, but above all because there are no air chambers between the rotor and the cavity, and the pump effect is no longer originated, as previously described, the effect which could draw back the fluid with impurities to be pumped into the cavity. Since the fluid is no longer drawn back inside, there is no deposit of impurities between the rotor and the cavity that houses it. The motor no longer gets damaged or experiences no further malfunctions, and the service life is considerably extended.

BRIEF DESCRIPTION OF THE DRAWINGS

These and other advantageous characteristics of the present invention will become more apparent from the following description of an embodiment provided only by the way of example, with no limitation, and which refer to the following drawings wherein.

DETAILED DESCRIPTION OF THE INVENTION

Figure 2:
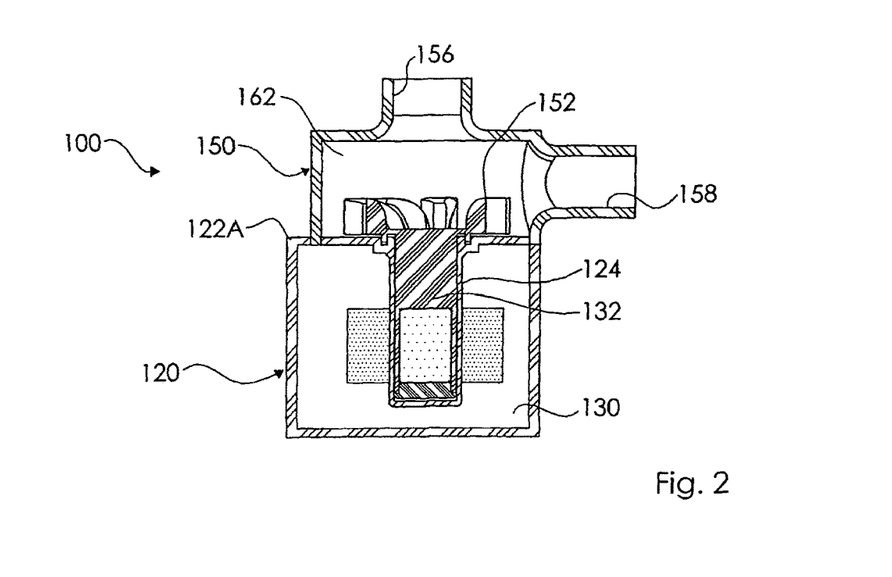
FIG. 2 is a cross section of a motor pump according to the present invention.
Figure 5:
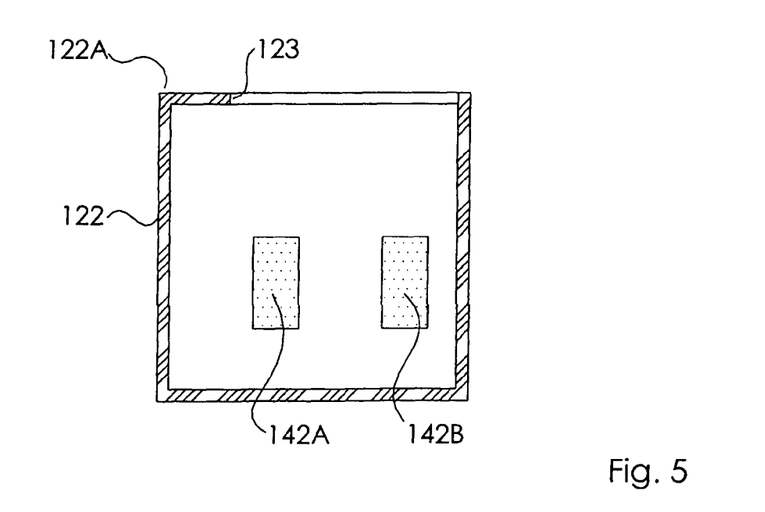
Figure 7:
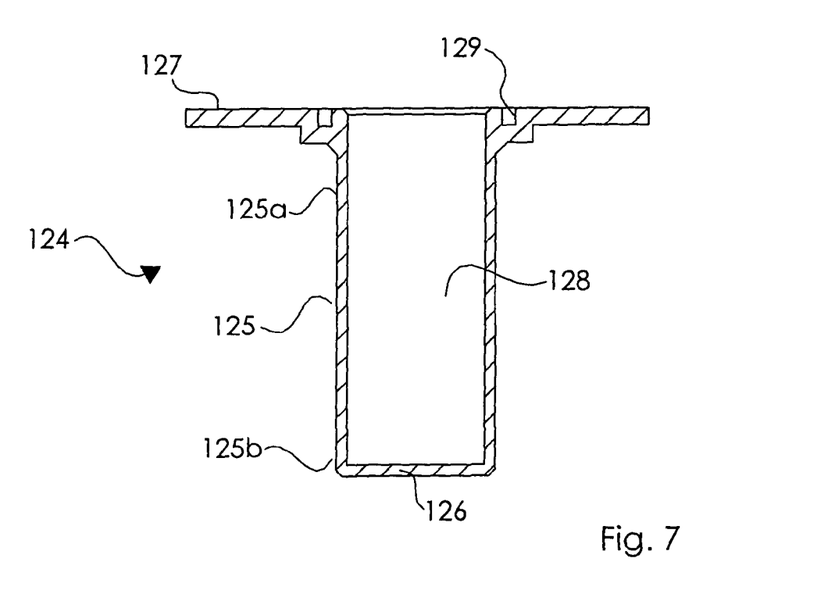
Figure 10:
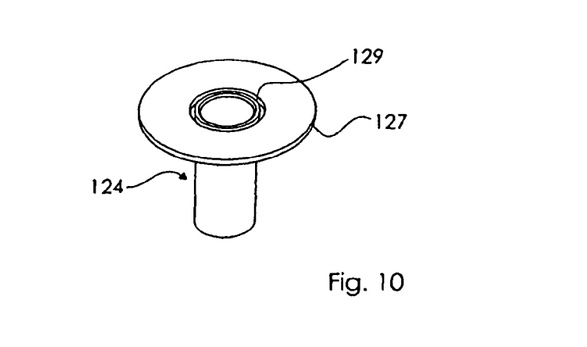

In FIG. 2, generally indicated with 100 is a motor pump comprising a synchronous electric motor 120 coupled to a pump 150, such as a pump for aquariums or a pump for household appliances, such as washing machines and dishwashers. The motor 120 comprises a motor body 122, which, as better illustrated in FIG. 5, is delimited by walls, in particular an upper wall 122A where a circular opening 123 is formed. FIGS. 7 and 10 show in detail a cylindrical element 124 inserted inside the motor body 122, wherein the cylindrical element is formed by a tubular element 125 having two opposite ends: a first open end 125a and a second end 125b closed by a bottom 126. A collar 127 is mounted on the first end 125a of the tubular element 125 with dimensions corresponding to the circular opening 123 made in the upper wall 122A, so by inserting the cylindrical element 124 into the motor body 122, the collar 127 closes the circular opening 123. A circumferential recess 129 is made on the collar 127, whose function will be described below.

Figure 4:
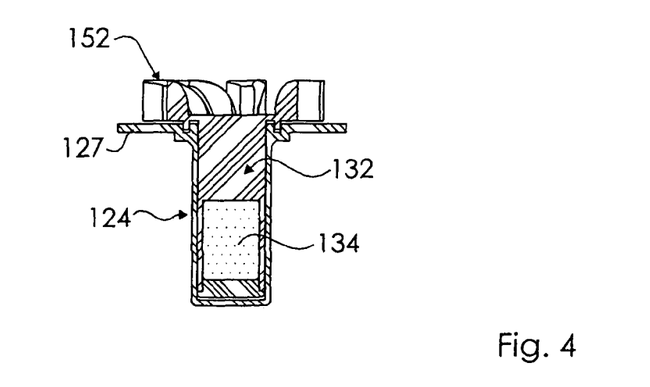
Figure 6:
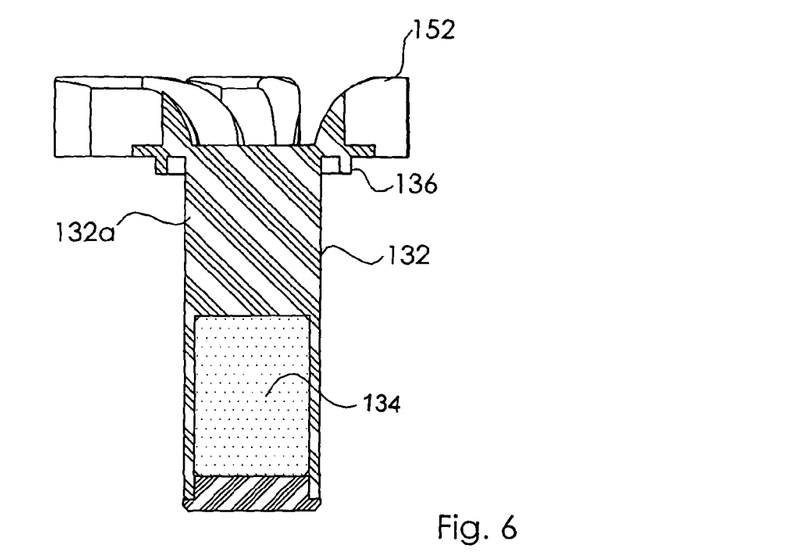
FIGS. 6 and 7 are cross sections showing details of FIG. 4, i.e., the rotor with impeller and the cylindrical element able to contain the rotor.
Figure 8:
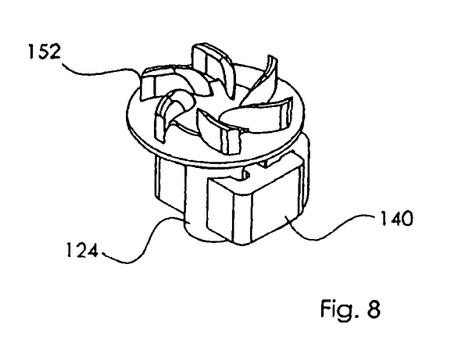
FIG. 8 is a perspective view of the rotor with impeller housed in the stator of the motor pump of FIG. 2.
Figure 9:
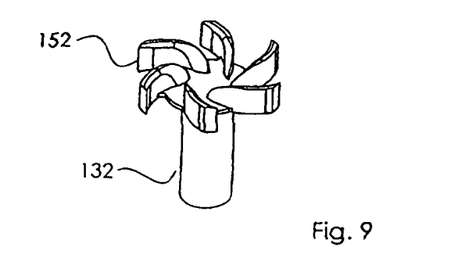
FIGS. 9, 10 and 11 are perspective views that illustrate, in exploded views, what components collectively illustrated in FIG. 8, in particular, respectively the rotor with the impeller, the cylindrical element, and the stator.

The cylindrical element 124, inside the pump body 122, thus defines two cavities: a first cavity 128 inside the cylindrical element 124, and a second cavity 130 outside the cylindrical element 124 but inside the motor body 122. The rotor 132 is housed inside the first cavity 128 (see FIG. 4), while a stator 140 is housed in the second cavity 130 (see FIG. 8). The rotor 132, as better illustrated in FIGS. 4 and 6, has a shape corresponding to that of the cylindrical element 124 so that it is possible to insert the rotor 132 inside the cylindrical element 124, completely filling the first cavity 128. Thus, the rotor 132 is supported during its rotation along its entire outer cylindrical surface by the cylindrical element 124.

Figure 11:
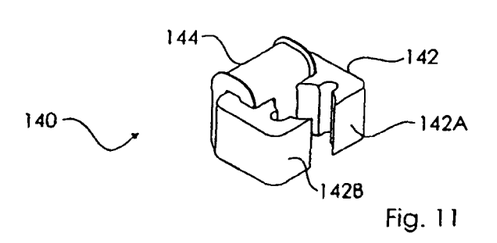

The rotor 132 contains a magnet 134 and it is coupled at its one end 132a directly and axially to the impeller 152 of the pump 150. At the end 132a coupled to the impeller 152, the rotor 132 has a circumferential projection 136 of dimensions corresponding to that of the circumferential recess 129 formed on the cylindrical element 124. By inserting the rotor 132 within the cylindrical element 124, the circumferential projection 136 enters into the circumferential recess 129, which, therefore, acts as a guide for the relative rotation between the rotor 132 and the cylindrical element 124. The stator 140, as shown in FIG. 11, comprises a statoric pack 142 of ferromagnetic material having two pole pieces 142A, 142B and an electric winding 144 wound also.

Figure 3:
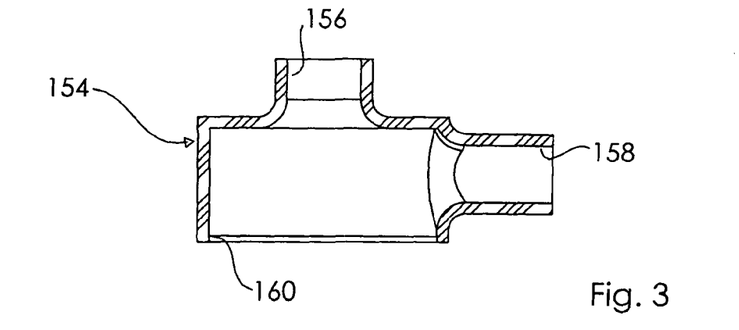
FIGS. 3, 4 and 5 are cross sections showing, in exploded views, the motor pump of FIG. 2 and, in particular, respectively illustrate the pump body, the rotor with impeller housed inside a cylindrical element, and the motor body.

The pump 150 comprises a pump body 154 inside which the impeller 152 is housed. As can be seen more clearly in FIG. 3, the pump body 154 includes an inlet or a suction intake 156 through which the liquid to be pumped is sucked and an outlet 158 through which the pumped liquid comes out. The pump body 154 also includes a circular opening 160 having dimensions corresponding of the collar 127 of the cylindrical element 124 so, by mounting the pump body 154 onto the motor body 122, the circular opening 160 is closed by the collar 127. Inside the pump body 154, when the impeller 152 is inserted inside, a passage 162 (see FIG. 2) of the liquid is defined that connects the suction intake 156 to the outlet 158, and which has dimensions equal or higher than the dimensions of the suction intake 156 and the outlet 158. This way, any foreign body that may penetrate inside the pump body 154 through the suction intake 156 is able to cross the passage 162 and comes out from the outlet 158.

For the assembling of the motor pump, it is sufficient to perform the following steps: (a) insert the stator 140 into the motor body 122; (b) insert the cylindrical element 124 into the motor body 122 so that the collar 127 closes the circular opening 123 of the motor body 122; (c) insert the rotor 132 with the impeller 152 inside the cylindrical element 124 so that the circumferential projection 136 is inserted inside the circumferential recess 129; and (d) mount the pump body 154 onto the motor body 122 so that the circular opening 160 of the pump body 154 is closed by the collar 127 of the cylindrical element 124. As can be noted, the stator 140 with the electric winding 144 is housed inside the second cavity 130 of the motor body 122, which is completely insulated, so that there is no possibility that liquid can penetrate and come into contact with the electric winding 144.

By feeding the electric winding 144 of the stator 140 with electricity, magnetic poles are generated at the pole pieces 142A, 142B, which interacts with the magnetic field of the magnet 134 of the rotor 132 putting the rotor 132 in rotation and, therefore, putting the impeller 152 in motion. The rotor 132 rotates inside the cylindrical element 124, which acts as a plain bearing. The cylindrical element 124 is preferably made with self-lubricating and anti-wear material, such as a polymeric material. The construction of such a motor is very simple due to the reduced number of components necessary for its realization. The time and the cost of construction are, therefore, considerably reduced.

It can be noted that the rotor 132 fully engages the first cavity 128 of the cylindrical element 124, whereby the contact surface between the rotor 132 and the cylindrical element 124 is remarkable, and then the rotor is suitably supported inside the cylindrical element 124. Thanks to this feature, the operation of the rotor is more regular and also wear is reduced. Moreover, the following very important characteristic has to be noted: between the cylindrical element 124 and the rotor 132 there is no space or air chambers so that the above pump effect is not created, thus avoiding that impurities contained in the liquid to be pumped, which as already explained is a source of malfunctionings and failure, penetrate into the cylindrical element 124.

Thanks to the simplicity of construction, the large contact surface between the rotor and the cylindrical element is realized, and because there are no air chambers in the cavity that houses the rotor, the motor is extremely reliable and its service life is considerably increased with respect to the motors of prior art. It should also be considered that due to the contact between the rotor 132 and the cylindrical element 124, the air gap existing between the stator 140 and the rotor 132 is reduced to the minimum possible and, in such condition, the magnetic field of the stator 140 and that of the rotor 132 are closely linked. Consequently, between the voltage that feeds the electric winding of the stator 140 and the electric current passing through there, there is a very little phase angle φ that is very close to zero, and then the so-called power factor Cos φ is essentially equal to 1. This way, the electric current in the winding 144 is the minimum possible and, therefore, the electrical losses due to the Joule effect are reduced to a minimum. In so doing, the efficiency of the electric motor is high and, with the same electric power of known motors, it is able to operate a pump that absorbs more power.

Figure 12:
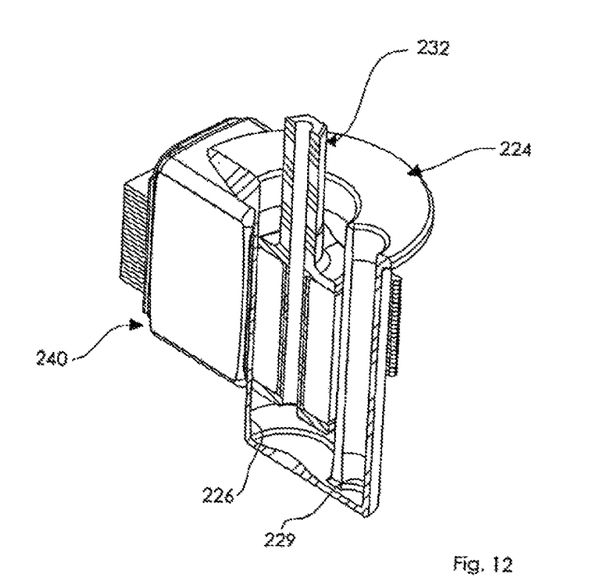
FIG. 12 is a perspective view illustrating a variant of the invention relating to the cylindrical element and the rotor contained therein.
Figure 13:
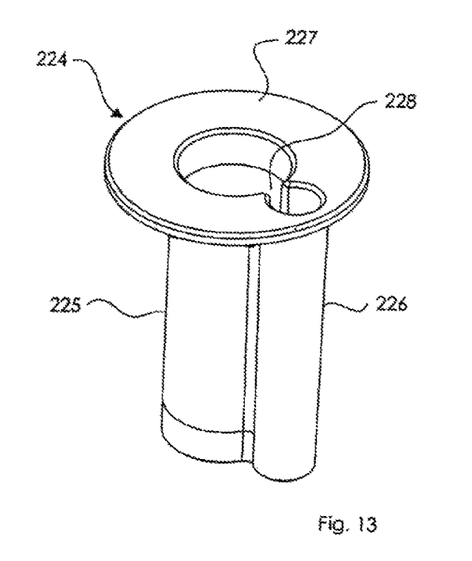
FIGS. 13 and 14 are perspective views of the cylindrical element of FIG. 12 respectively shown in full and partially sectioned views.
Figure 14:
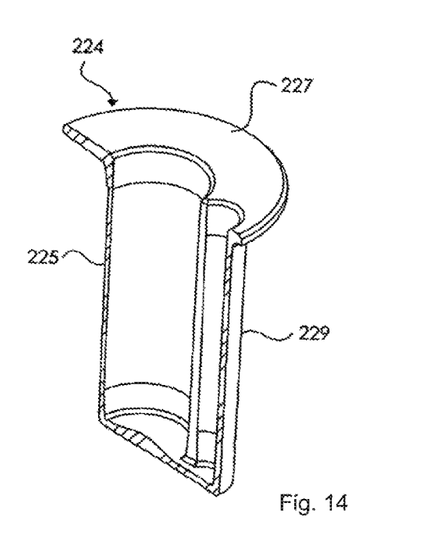
Figure 15:
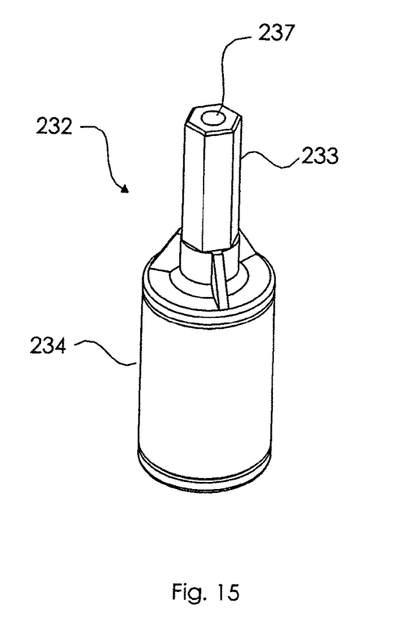
FIGS. 15 and 16 are perspective views of the rotor of FIG. 12, respectively shown in full and partially sectioned views.
Figure 16:
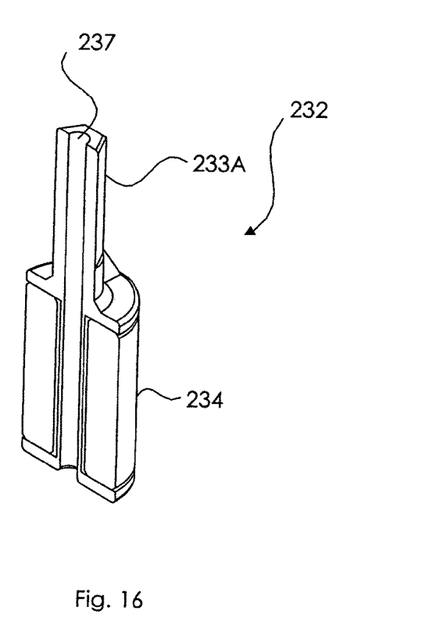

FIG. 12 shows a variant of the invention and, in particular, a rotor 232 inserted inside a cylindrical element 224. As better seen from FIGS. 13 and 14, the cylindrical element 224 is similar to the cylindrical element 124, i.e., it has a tubular element 225 provided with a collar 227. A tubular duct 229 is placed beside the tubular element 225 and it has the same length but of smaller section. A longitudinal slot 228 is formed in the area of contact between the tubular element 225 and the duct 229 for the entire length of the two elements, which puts in contact the inside of the tubular element 225 with the inside of the duct 229. As will be seen from FIGS. 12, 15 and 16, the rotor 232 is provided with a central pin 233 on which a magnet 234 is mounted, while the impeller 152 is mounted at the free end 233A of the pin 233. The pin 233 has an axial through hole 237. As noted in FIG. 12, the length of the rotor 232 is less than the length of the tubular element 225 and, therefore, the rotor 232 is spaced apart from the bottom 226 of the tubular element 225. In FIG. 12, a stator 240 is represented, which externally surrounds the cylindrical element 224.

When the pump is operated, the rotor 232 rotates inside the tubular element 225, and the impeller 152 coupled to the rotor 232 thrusts the liquid to be pumped into the duct 229 and, thanks to the longitudinal slot 228, the liquid comes into contact with the rotor 232 enabling both the cooling and lubrication of the contact area between the rotor 232 and the tubular element 225. Because the rotor 232 is spaced apart from the bottom of the tubular element 225, the liquid thrust through the slot 228 goes inside the tubular element 225 in the area below the rotor 232 and then goes up along the through hole 237 of the rotor 232 and, finally, comes out from the free end 233A of the pin 233. This way, a forced circulation of liquid is created that considerably increases the amount of liquid that enters into the longitudinal slot 228 and, then, in the contact area between the rotor 232 and the tubular element 225. This effectively cools and lubricates the area where there is friction between the rotor and the tubular element.

Finally, it is evident that any variation or modification, functionally or conceptually equivalent, falls under the scope of the present invention. For example, it is possible to have a stator with a different number of pole pieces, or having more electric windings, or having stator packs with a different shape.

Generally, however, the invention encompasses in scope a synchronous electric motor (120) for operating a pump (150). The motor (120) comprises a motor body (122), a stator (140) and a rotor (132,232) coupled to an impeller (152) of the pump (150). The motor (120) also comprises a cylindrical element (124,224) that extends towards the inside of the motor body (122) from one of its outer walls (122A) so as to define a first cylindrical cavity (128) open to the outside to insert inside the rotor (132,232), wherein the rotor (132,232) has a circular cross section essentially corresponding to the inner section of the cylindrical element (124,224) so that the rotor (132,232) is in contact with the cylindrical element (124,224), and then there is friction between the rotor (132,232) and the cylindrical element (124,224) when the rotor (132,232) rotates, and the rotor (132,232) is shaftless and axially and directly coupled to the impeller (152) of the pump (150).

The invention claimed is:

1. A motor pump comprising:
    (a) a first pump; and
    (b) an electric motor coupled to the first pump, wherein the electric motor includes
        (i) a motor body, a stator and a rotor coupled to an impeller of the first pump, wherein at least one permanent rotor magnet is embedded within the rotor; and
        (ii) a cylindrical element that extends towards an inside of the motor body from one of a plurality of outer walls of the motor body so as to divide the inside of the motor body in two cavities, wherein the two cavities include a first cylindrical cavity arranged inside the cylindrical element that is able to house the rotor and a second cavity disposed outside the cylindrical element and able to house the stator; and
    (c) a duct placed on the side of the cylindrical element, wherein the duct defines a longitudinal slot of communication between the cylindrical element and the duct, wherein the duct is in communication with the first pump so that the fluid pumped by the first pump also enters into the duct and lubricate, or cool, or lubricate and cool, a contact area between the rotor and the cylindrical element,
    wherein the cylindrical element has a first open end, opposite to a second end, positioned at one of the plurality of outer walls of the motor body so that the first cylindrical cavity is open to the outside so as to insert the rotor inside the cylindrical element, wherein the rotor, for at least part of the length of the rotor, has a circular cross section essentially corresponding to an inner section of the cylindrical element so that the rotor is in contact with the cylindrical element and so there is friction between the rotor and the cylindrical element when the rotor rotates, and wherein the rotor is shaftless and axially and directly coupled to the impeller of the first pump.

2. A motor pump according to claim 1, wherein the entire portion of the rotor housed inside the cylindrical element has a circular cross section corresponding to the inner section of the cylindrical element so that all of the entire portion of the rotor housed inside the cylindrical element is in contact with the cylindrical element.

3. A motor pump according to claim 2, wherein the length of the rotor is equal or higher than the length of the cylindrical element so that the rotor essentially fills the entire first cavity inside the cylindrical element so that between the cylindrical element and the rotor there is no space or gap and frictional contact between the rotor and the cylindrical element occurs for the entire length of the first cavity of the cylindrical element.

4. A motor pump according to claim 1, wherein said cylindrical element is made of self-lubricating and wear-resistant material.

5. A motor pump according to claim 4, wherein said self-lubricating and wear-resistant material is a polymeric material.

6. A motor pump according to claim 1, wherein said cylindrical element comprises a collar at a first open end of said cylindrical element, and said motor body has an opening provided with a shape and dimensions corresponding to that of said collar so that by inserting said cylindrical element inside said motor body said collar closes said opening of said motor body.

7. A motor pump according to claim 1, wherein said rotor comprises at least one permanent magnet.

8. A motor pump according to claim 1, wherein said stator comprises at least one statoric pack defining at least two pole pieces faced to said cylindrical element and at least one electric winding to generate a magnetic field and then at least two magnetic poles at said at least two pole pieces.

9. A motor pump according to claim 1, wherein said duct also communicates with an area interposed between the rotor and a bottom of the cylindrical element, and the rotor is also provided with a through hole so that the fluid that arrives between the bottom of the cylindrical element and the rotor passes through the rotor and then comes out of the rotor.

10. A motor pump according to claim 1, wherein said first pump comprises a pump body inside which the impeller of said first pump is housed, wherein the pump body is provided with a suction intake through which the liquid to be pumped is sucked and an outlet through which the pumped liquid goes out, and inside the pump body is defined a passage that connects the suction intake to the outlet, wherein the passage has a dimension equal or greater than the dimension of the suction intake and of the outlet so that any foreign body that penetrates inside the pump body through the suction intake may pass through the passage and go out from the outlet.

* * * * *